United States Patent [19]

Imamura

[11] Patent Number: 4,644,465

[45] Date of Patent: Feb. 17, 1987

[54] APPARATUS FOR CONTROLLING I/O INTERRUPT IN MULTIPROCESSOR SYSTEM

[75] Inventor: Jiro Imamura, Hadano, Japan

[73] Assignee: Hitachi, Ltd., Tokyo, Japan

[21] Appl. No.: 623,086

[22] Filed: Jun. 21, 1984

[30] Foreign Application Priority Data

Jun. 22, 1983 [JP] Japan .................................. 58-112348

[51] Int. Cl.[4] .......................... G06F 9/46; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,271,468 | 6/1981 | Christensen et al. | 364/200 |
| 4,386,400 | 5/1983 | Cope et al. | 364/200 |
| 4,476,524 | 10/1984 | Brown et al. | 364/200 |

*Primary Examiner*—Eddie P. Chan
*Attorney, Agent, or Firm*—Antonelli, Terry & Wands

[57] ABSTRACT

An apparatus for controlling interrupts is provided in a system controller SC of a multiprocessor system in which a plurality of instruction processors IP share a main storage MS and a channel controller CHC through the system controller SC. The apparatus for controlling interrupts holds I/O interrupt control data for each of the instruction processors IP, and selects the most suitable instruction processor IP to process an I/O interrupt, without receiving responses from all of the instruction processors IP.

3 Claims, 4 Drawing Figures

FIG. 4

| INPUT OF SELECTIVE CIRCUIT | IP0: WAIT<br>IP1: WAIT | IP0: WAIT<br>IP1: $\overline{\text{WAIT}}$ | IP0: $\overline{\text{WAIT}}$<br>IP1: WAIT | IP0: $\overline{\text{WAIT}}$<br>IP1: $\overline{\text{WAIT}}$ |
|---|---|---|---|---|
| SIGNALS 236A AND 236B ="1"<br>SIGNAL 234A = 234B | $P_0 \overline{P_1}$ | $P_0 \overline{P_1}$ | $\overline{P_0} P_1$ | $P_0 \overline{P_1}$ |
| SIGNALS 236A AND 236B ="1"<br>SIGNAL 234A ≠ 234B | $P_0 P_1$ | $P_0 \overline{P_1}$ | $\overline{P_0} P_1$ | $\overline{P_0} P_1$ |
| SIGNAL 236A ="1", 236B ="0" | $P_0 \overline{P_1}$ | $P_0 \overline{P_1}$ | $P_0 \overline{P_1}$ | $P_0 \overline{P_1}$ |
| SIGNAL 236A ="0", 236B ="1" | $\overline{P_0} P_1$ | $\overline{P_0} P_1$ | $\overline{P_0} P_1$ | $\overline{P_0} P_1$ |

APPARATUS FOR CONTROLLING I/O INTERRUPT IN MULTIPROCESSOR SYSTEM

BACKGROUND OF THE INVENTION

The present invention relates to an apparatus for controlling I/O interrupts in a multiprocessor system which has a plurality of instruction processors. More specifically, the invention relates to an apparatus for controlling I/O interrupts of a plurality of levels received from a common I/O device, and which selects an instruction processor from the plurality of instruction processors to process each I/O interrupt.

When an I/O interrupt is to be processed in a multiprocessor system which has a plurality of instruction processors, not only the instruction processor which energized the channel that issued the I/O interrupt, but also a desired one of the instruction processors of the plurality of instruction processors is selected, as disclosed in, for example, U.S. Pat. No. 4,271,468. In a system of this type, and I/O interrupt is processed as described below. That is, a request for an I/O interrupt from a channel controller is temporarily stored in a system controller which asks the individual instruction processors whether or not they can accept the interrupt. Each instruction processor informs the system controller whether or not the interrupt can be accepted. When it has received all the replies from the individual instruction processors, the system controller selects the optimum instruction processor, and enables it to perform the interrupt processing. This is described below in detail, with reference to a system constructed as shown in FIG. 1.

FIG. 1 illustrates the construction of a multiprocessor system in which two instruction processors 1A and 1B share a main storage MS3 and a channel controller CHC4 through a system controller SC2. I/O controllers IOC5 are connected to channels CH of the channel controller CHC4, and input/output devices I/O are connected to each of the I/O controllers IOC5. The main storage MS3 stores an interrupt queue 31, which is a list of pending I/O interrupt requests for each of a plurality of levels. in FIG. 1, symbols $Q_0$ to $Q_7$ denote queues for each of the levels.

The system controller SC2 is provided with an interrupt-pending register 21 which indicates whether or not the interrupt queues $Q_0$ to $Q_7$ in the main storage MS3 are empty, and which has bits 0 to 7 that correspond to the queues $Q_0$ to $Q_7$.

An I/O interrupt request is sent from the channel controller CHC4 and is registered in the interrupt queue Qi of the corresponding level in the main storage MS3 by the system controller SC2. In this case, the corresponding bit of the interrupt-pending register 21 in the system controller SC2 becomes "1" when an I/O interrupt request is registered for the first time in an interrupt queue Qi which was empty. When there is already at least one interrupt request, however, that bit is already "1", and the register 21 does not change.

The system controller SC2 sends the contents of the interrupt-pending register 21 to the instruction processors 1A, 1B simultaneously. When the instruction processors 1A, 1B are ready to be interrupted, they send the system controller SC2 IP-accept signals and queue-identifier signals of the highest-order instruction processor which has not been interrupt-masked. In this case, if an instruction processor IP is in a wait state, it also sends a wait signal to the system controller SC2.

The system controller SC2 executes the following processing in response to the signals from the instruction processors 1A, 1B. When the queue-identifier signals from the instruction processors IP do not agree, the instruction processors 1A, 1B perform an interrupt. When the instruction processors 1A, 1B accept the interrupt in response to queue identifier signals of the same level, only one instruction processor IP is selected for the interrupt, according to a predetermined priority. The instruction processor IP which accepted the interrupt but which was not selected sends a reset signal to the system controller SC2 to cancel the accept condition, and returns a latch to its initial condition.

According to the conventional I/O interrupt processing described above, the system controller asks a plurality of instruction processors IP whether or not they can accept an interrupt. When a plurality of instruction processors IP can accept the interrupt, accept signals are sent back from the instruction processors IP to the system controller SC. Therefore instruction processors IP which have sent back accept signals are not able to perform ordinary processing from the time they received the enquiry for interrupt-accept until it is determined whether of not they have been selected. A circuit controlling the interrupt must be provided at two places, i.e., for the system controller SC and for the instruction processors IP, resulting in an increased quantity of hardware, and a complex control operation.

SUMMARY OF THE INVENTION

The object of the present invention is to provide an interrupt control apparatus in which the system controller does not work in answer to individual instruction processors IP, but which selects the most suitable instruction processor IP to execute the I/O interrupt processing.

According to the present invention, the system controller SC stores I/O interrupt control data for each of the instruction processors IP, and processes an I/O interrupt without receiving responses from individual instruction processors IP.

BRIEF DESCRIPTION OF THE DRAWINGS

FIG. 4 is a chart which illustrates the logic of the select circuit of FIG. 2.

DESCRIPTION OF THE PREFERRED EMBODIMENTS

Figure 2:
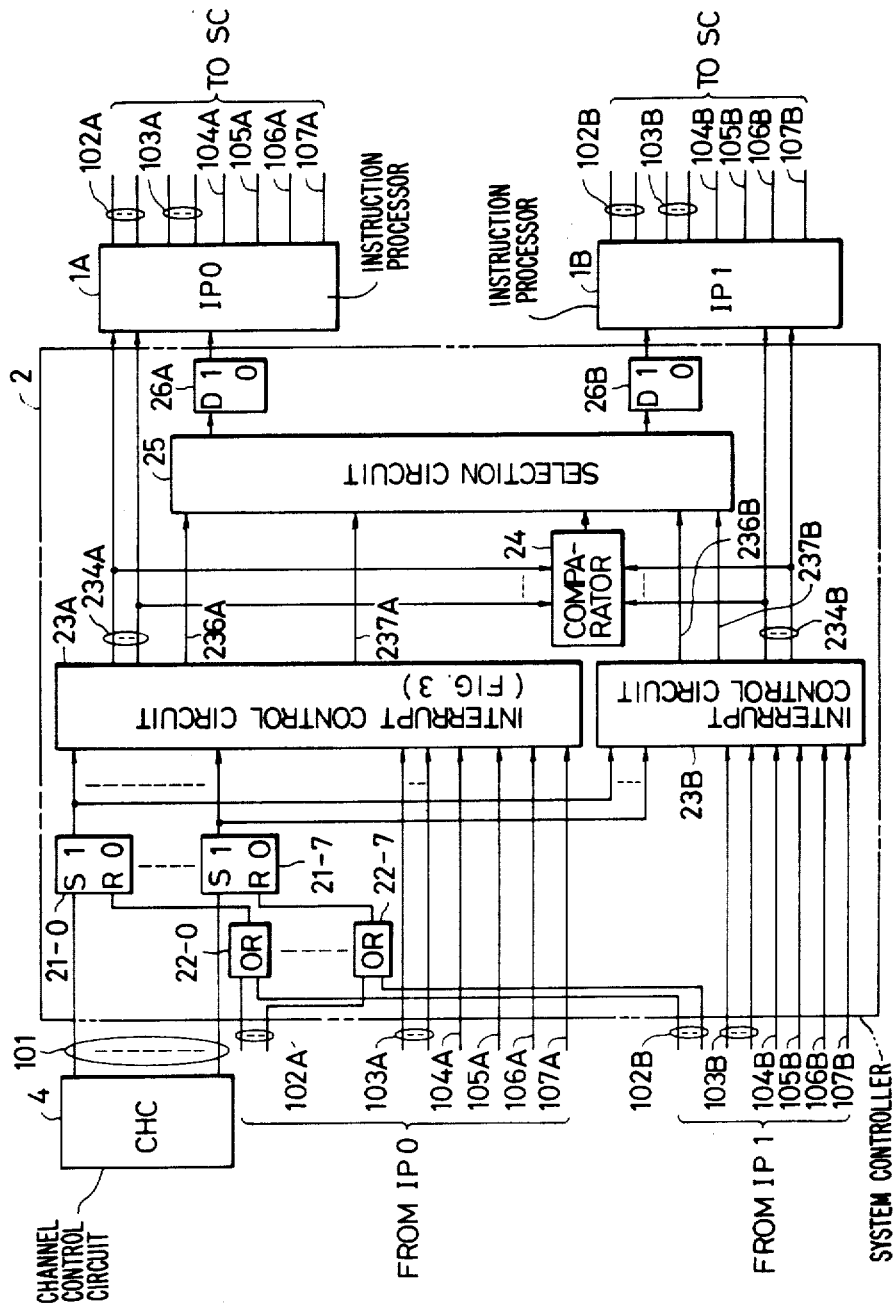
FIG. 2 is a block diagram which illustrates an embodiment of the present invention.

FIG. 2 is a block diagram of an embodiment of the present invention, which illustrates in detail how the instruction processors IP, the system controller SC, and the channel controller CHC are connected, as well as portions in the system controller SC related to the present invention. In FIG. 2, two instruction processors 1A, 1B are connected to a system controller SC2 to which a channel controller 4 is also connected. The construction of the system controller SC2 will be described hereinbelow.

Figure 1:
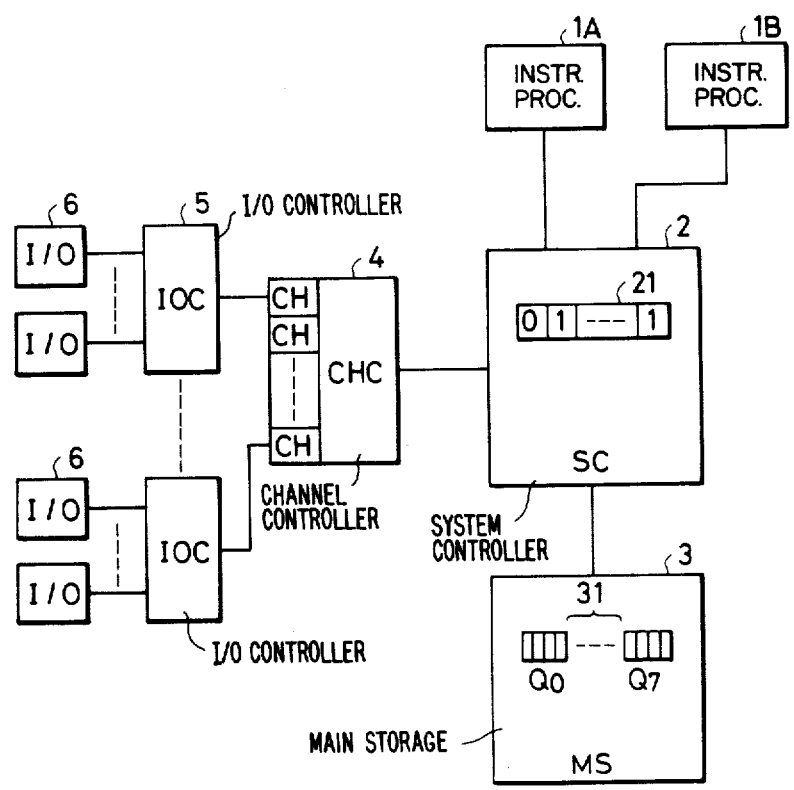
FIG. 1 is a block diagram of the construction of a multiprocessor system.

Latches (interrupt-pending latches) 21-0 to 21-7 constitute the interrupt pending register 21 of FIG. 1, and correspond to each of the levels of the interrupt queues $Q_0$ to $Q_7$ in the main storage MS. The interrupt-pending latches 21-0 to 21-7 are set by the channel controller CHC4 through interrupt-notification lines 101 provided for each of the levels, and are reset by the instruction processors 1A, 1B through signal lines 102A, 102B, and OR gates 22-0 to 22-7.

Interrupt control circuits 23A, 23B (FIG. 3) determine the highest-order queue-identifier signal that can be processed for each of the instruction processors IP, the interrupt control circuit 23A corresponds to the instruction processor 1A, and the interrupt control circuit 23B corresponds to the instruction processor 1B.

The interrupt control circuit 23A consists of I/O interrupt mask latches 230-0 and 230-7, an IPO busy latch 231, AND gates 232-0 to 232-7, an inverter 233, a priority determination circuit 234, an OR gate 235, an AND gate 236, and a wait-state indication latch 237. The interrupt control circuit 23B is constructed in the same manner.

The I/O interrupt mask latches 230-0 to 230-7 in the interrupt control circuit 23A indicate whether or not I/O interrupt processing can be effected by the instruction processor 1A, for each of the levels. Data (interrupt mask data) is preset in the group of latches by the instruction processor 1A through signal lines 103A. A signal line 104A is used to set the IPO busy latch 231, a signal line 105A is used to reset the IPO busy latch 231, a signal line 106A is used to indicate that the instruction processor 1A is inhibited, and a signal line 107A is used to indicate that the instruction processor 1A is in the wait state. Similar signal lines are provided for the interrupt control circuit 23B.

A comparator circuit 24 determines whether or not queue identifier signals obtained from the interrupt control circuits 23A, 23B agree. A selection circuit 25 determines interrupt processing for either or both of the instruction processors 1A, 1B, based upon the, comparison result of comparator circuit 24, interrupt selection requests corresponding to the instruction processors IP that are produced by the interrupt control circuits 23A, 23B, and the wait stages. A latch 26A is a circuit which sets an interrupt processing instruction signal sent from the selection circuit 25 for the instruction processor 1A, and a latch 26B is a circuit which sets a similar interrupt processing instruction signal for the instruction processor 1B.

Figure 3:
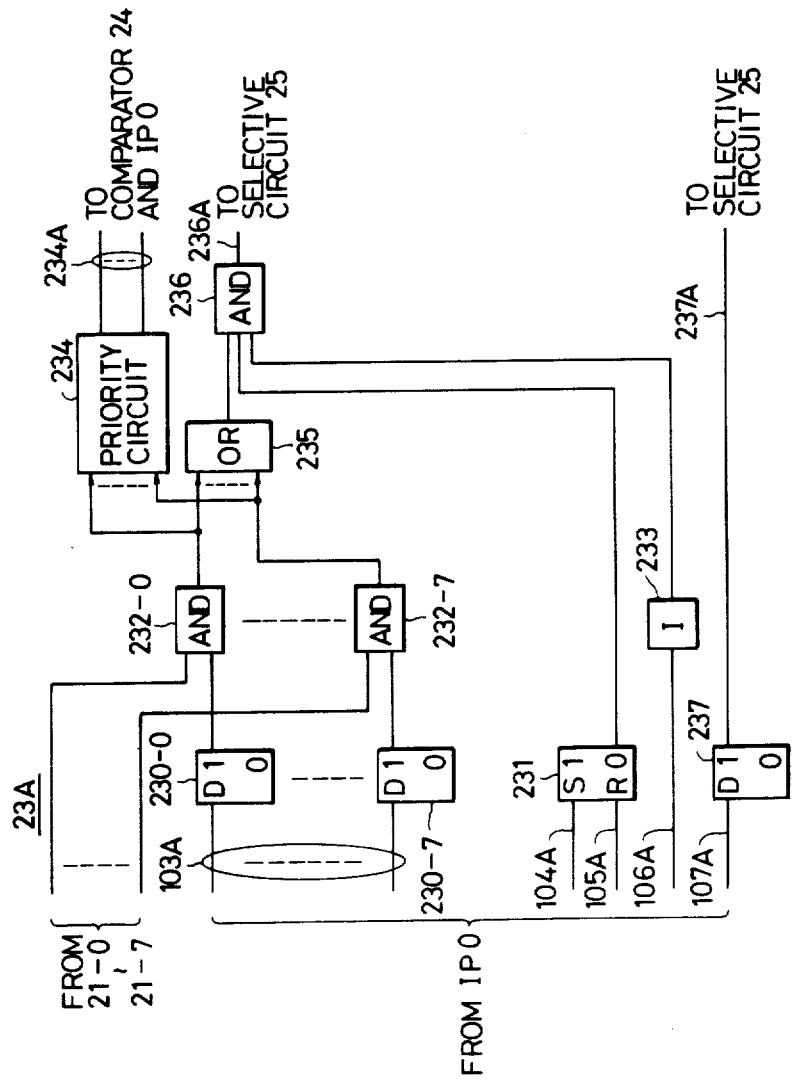
FIG. 3 is a block diagram which shows in detail the interrupt control circuit of FIG. 2.

The procedure of I/O interrupt processing will be described below with reference to FIGS. 2 and 3.

When an I/O interrupt is requested by an I/O device, the channel controller CHC4 registers it in one (Qi) of the interrupt queues $Q_0$ to $Q_7$ in the main storage MS, depending upon its level, and informs the system controller SC2 of the I/O interrupt request over the corresponding signal line 101. The system controller SC2 sets the interrupt request in the latch (21-i) of the interrupt-pending latches 21-0 to 21-7. If the latch 21-i has already been set, no change takes place.

Referring now to the interrupt control circuit 23A for the instruction processor 1A, the AND gates 232-0 to 232-7 output AND conditions of the interrupt pending latches 21-0 to 21-7 and the corresponding I/O interrupt mask latches 230-0 to 230-7, and outputs a logical "1" or "0" for each of the levels. For instance, if the AND gate 232-0 outputs a logical "1" because both the latches 21-0 and 230-0 are set, it means that the interrupt queue of the corresponding level that is to be processed is in the main storage MS, and interrupt processing at this level has not been masked by the instruction processor 1A. This is true for the other AND gates 232-1 to 232-7.

The outputs from the AND gates 232-0 to 232-7 are sent to a priority circuit 234. When only one of the outputs from the AND gates 232-0 to 232-7 is logical "1", the priority circuit 234 will ouput a queue identifier signal indicating the number of the corresponding level. When more than one of the outputs from the AND gates 232-0 to 232-7 are logical "1", however, the priority circuit 234 selects just one of them according to a predetermined priority, and outputs a queue identifier signal for that level.

The outputs from the AND gates 232-0 to 232-7 pass through the OR gate 235, and are then input to the AND gate 236. In addition to the output from the OR gate 235, the AND gate 236 receives an output from the 0 side of the IPO busy latch 231, and an output from the inverter 233 which inverts the status of the IP inhibit signal line 106. When the AND result thereof is true, the AND gate 236 outputs a logical "1". That is, the AND gate 236 outputs a logical "1" when an interrupt queue that can be executed by the instruction processor 1A is generated under conditions in which the instruction processor 1A is operating and all previous interrupt processings have been completed by the instruction processor 1A. The output of the AND gate 236 is input to the selection circuit 25 as an interrupt request signal for the instruction processsor 1A.

The queue-identifier signal selected by the priority circuit 234 in the interrupt control circuit 23A is input to the comparator circuit 24. Similarly, a queue-identifier signal obtained by the interrupt control circuit 23B is also input to the comparator circuit 24, which determines whether the highest-priority queue-identifier signal for the instruction processor 1A agrees with the highest-priority queue-identifier signal for the instruction processor 1B. The output of the comparator circuit 24 is input to the selection circuit 25 which also receives the wait states of the instruction processors 1A and 1B through the latch 237 of the interrupt control circuit 23A and the similar latch of the interrupt control circuit 23B.

The selection circuit 25 receives interrupt selection request signals (outputs of the AND gates 236) from the interrupt control circuits 23A, 23B, the wait states (outputs of the latches 237), and the comparison result of the comparator circuit 24, selects interrupt processing for either or both of the instruction processors 1A, 1B, and sends an instruction signal to the instruction processors IP through the latch 26A and/or 26B.

FIG. 4 tabulates cases determined by the selection circuit 25, wherein $P_0$ indicates that an interrupt processing instruction signal for the instruction processor 1A (IPO) is "1", $\overline{P_0}$ indicates that the interrupt processing instruction signal is "0", $P_1$ indicates that an interrupt processing instruction signal for the instruction processor 1B (IP1) is "1", and $\overline{P_1}$ indicates that that instruction signal is "0". In FIG. 4, as far as possible the instruction processor IP which is in the wait state is selected, in order to improve the performance of the system.

Referring now to the uppermost line of FIG. 4, when the interrupt selection request signals for IPO and IP1 are both "1", and the queue-identifier signals agree, IPO is selected if both IPO and IP1 are in wait state, and the IP which is in a wait state is selected if only one of them is in that state. When both of them are in $\overline{WAIT}$ state, IPO is selected. This is also true for the other lines.

When, for instance, the instruction processor 1A is instructed by the selection circuit to perform interrupt processing, the instruction processor 1A reads from the main storage MS the interrupt queue that corresponds to the queue-identifier signal selected by the priority circuit 234 in the interrupt control circuit 23A.

If the queue of that level is emptied by the reading of the queue from the main storage MS, the instruction processor 1A resets the corresponding one of the interrupt-pending latches 21-0 to 21-7 over the signal line 102A. The instruction processor 1A also sets the IPO busy latch 231 to "1" over the signal line 104A, reads out the interrupt request from the head of the interrupt queue that has been read out, and processes that interrupt. The setting of the latch 231 suppresses any interrupt selection requests from the selection circuit 25 to the instruction processor 1A. If an interrupt selection request is issued for the other instruction processor 1B and the relevant conditions are satisfied, the selection circuit 25 instructs the instruction processor 1B to process that interrupt. When the processing of an interrupt request that has been read out is completed, the instruction processor 1A resets the latch 231. This enables the issue of any further interrupt selection request for the instruction processor 1A.

Although this embodiment deals with the case in which two instruction processors IP are connected to the system controller SC, obviously any number of instruction processors IP can be connected thereto.

According to the present invention, interrupt control data for each of the instruction processors IP is controlled as a group by the system controller SC, and the most suitable instruction processor IP is selected to execute the I/O interrupt processing, without receiving responses from each of the instruction processors IP. Therefore, the performance of the whole system is improved, the quantity of hardware is not increased, and the control operation is prevented from becoming complex.

What is claimed is:

1. In a multiprocessor system comprising a plurality of instruction processors, a system controller to which said instruction processors are connected, a shared main storage which is connected to said system controller and which stores pending interrupt requests in the form of a queue for each of a plurality of levels of interrupt, and a channel controller connected to said system controller, an apparatus for controlling interrupts which is provided in said system controller and which enables said instruction processors to process interrupt requests from said channel controller, said apparatus comprising:

register means provided with a plurality of memory positions corresponding to the respective levels of interrupt queues, said memory positions being set when an interrupt request is received having the corresponding level and which indicates whether the corresponding queue is empty or not empty;

a plurality of interrupt control means each provided for a respective one of said instruction processors, each of said interrupt control means including: (a) holding means for holding interrupt control data which indicates the ability of the corresponding instruction processor to process each of the plurality of levels of interrupt, and (b) output means responsive to the contents of said register means and the contents of said holding means for generating an interrupt selection request signal indicating the existence of an interrupt request which the corresponding instruction processor is able to process for selecting the interrupt queue of an interrupt which is to be processed, and for outputting a selected queue-identifier signal which identifies the selected interrupt queue to the corresponding instruction processor;

comparator means for comparing the queue-identifier signals from said plurality of output means and for outputting a coincidence/noncoincidence signal indicating the result of said comparison; and selection means connected to each of said interrupt control means and to said comparator means for applying an interrupt processing instruction signal to said instruction processors in response to said interrupt selection request signals and said coincidence/noncoincidence signals so that one instruction processor is selected for each selected interrupt queue in response to interrupt selection request signals from said plurality of output means and said coincidence/noncoincidence signals from said comparator means.

2. The apparatus for controlling interrupts according to claim 1, wherein each of said holding means is provided with an interrupt mask acting as interrupt control data, and said output means selects the contents of the memory positions of said register means that have not been masked by said interrupt mask and outputs the queue-identifier signal which identifies the queue with the highest priority from the selected queues that are not empty.

3. The apparatus for controlling interrupts according to claim 2, wherein each of said holding means additionally holds as interrupt control data a wait signal that indicates that the corresponding instruction processor is in a wait state, said wait signal being applied to said selection means, said selection means operating to preferentially select an instruction processor which is in wait state according to said wait signals.

* * * * *